US012508195B1

(12) United States Patent
Huang

(10) Patent No.: US 12,508,195 B1
(45) Date of Patent: Dec. 30, 2025

(54) SEXUAL PRODUCT WITH DUAL-DRIVE STRUCTURE

(71) Applicant: Dongguan Renchun Electronics Co., Ltd., Guangdong (CN)

(72) Inventor: Junnv Huang, Guangdong (CN)

(73) Assignee: Dongguan Renchun Electronics Co., Ltd., Guangdong (CN)

( * ) Notice: Subject to any disclaimer, the term of this patent is extended or adjusted under 35 U.S.C. 154(b) by 65 days.

(21) Appl. No.: 18/963,616

(22) Filed: Nov. 28, 2024

(30) Foreign Application Priority Data

Nov. 15, 2024 (CN) ......................... 202422803191.7

(51) Int. Cl.
*A61H 19/00* (2006.01)

(52) U.S. Cl.
CPC ............. *A61H 19/44* (2013.01); *A61H 19/34* (2013.01); *A61H 2201/1215* (2013.01); *A61H 2201/1664* (2013.01)

(58) Field of Classification Search
CPC ................................................ A61H 19/00–50
USPC ............................... 600/38; 601/46, DIG. 16
See application file for complete search history.

(56) References Cited

U.S. PATENT DOCUMENTS 11,835,114 B1 * 12/2023 Leng ....................... F16H 25/12
12,064,386 B1 * 8/2024 Yan ....................... A61H 23/02
12,171,710 B1 * 12/2024 Huang ................... A61H 19/44
12,178,773 B1 * 12/2024 Wang ..................... A61H 19/50
12,208,053 B1 * 1/2025 Liu .................... A61H 23/0254
12,213,931 B1 * 2/2025 Wu ......................... A61H 19/44
12,290,487 B1 * 5/2025 Cao ...................... A61H 23/006
2023/0201075 A1 * 6/2023 Zheng ................ A61H 23/0254 601/80
2024/0030726 A1 1/2024 Kamel et al.
2024/0108538 A1 * 4/2024 Chen .................. A61H 23/0254
2024/0235240 A1 * 7/2024 Papadopoulos ........... H02J 9/04
2024/0252384 A1 * 8/2024 Zhou ...................... A61H 7/008
2025/0161147 A1 * 5/2025 Wang ..................... A61H 19/32
2025/0161150 A1 * 5/2025 Wang ..................... A61H 7/007

* cited by examiner

*Primary Examiner* — Paige Kathleen Bugg
(74) *Attorney, Agent, or Firm* — Rondaus PLLC; George Liu

(57) ABSTRACT

Disclosed is a sexual product with a dual-drive structure, comprising a housing and a driving device, wherein the housing is provided with a mounting cavity, the driving device is provided in the mounting cavity, the driving device comprises a rotating motor and a driving structure connected to the rotating motor, the driving structure comprises a rotating seat connected to the rotating motor, a guide seat provided on an outer wall of the rotating seat and a sliding seat provided on an outer wall of the guide seat, the outer wall of the rotating seat is provided with a driving groove that forms a closed loop around the outer wall of the rotating seat, the driving groove is provided with a first peak and a second peak, the first peak and the second peak are provided in a staggered manner, a driving block is provided in the driving groove.

18 Claims, 8 Drawing Sheets

SEXUAL PRODUCT WITH DUAL-DRIVE STRUCTURE

TECHNICAL FIELD

The present disclosure relates to the field of sexual products, and in particular to a sexual product with a dual-drive structure.

BACKGROUND

In existing massagers, telescoping and swinging structures are generally provided to mimic the effects of kneading and tapping. The current massage mechanisms feature combinations of telescoping and swinging structures, or dual-swinging structures.

However, the driving structures typically employed in these devices utilize a configuration where dual motors are matched with cam mechanisms, driving separately. This presents the following issues:

First, the volume of dual motors is relatively large, and in terms of overall cost, the motors contribute significantly to the expense.

Second, the cooperation between the cams and motors results in non-linear motion for both the telescoping and swinging structures, leading to a suboptimal user experience. Additionally, the motion frequency of the cams is greatly influenced by the structural design.

Consequently, in practical sexual products, they exhibit excessive vibration and provide limited, monotonous sexual stimulation.

SUMMARY

The primary objective of the present disclosure is to provide a sexual product with a dual-drive structure, with the aim of enhancing the existing driving mechanism structure, thereby enabling a single mechanism to incorporate two drive structures. Additionally, the movement is characterized by its linearity and high frequency.

To achieve this objective, the present disclosure provides a sexual product with a dual-drive structure, comprising:

a housing, wherein the housing is provided with a mounting cavity;

a driving device, wherein the driving device is provided in the mounting cavity, the driving device comprises a rotating motor and a driving structure, and the driving structure is connected to the rotating motor;

the driving structure comprises a rotating seat, a guide seat and a sliding seat, the rotating seat is connected to the rotating motor, the guide seat is provided on an outer wall of the rotating seat, and the sliding seat is provided on an outer wall of the guide seat;

the outer wall of the rotating seat is provided with a driving groove, the driving groove forms a closed loop around the outer wall of the rotating seat, the driving groove is provided with a first peak and a second peak, the first peak and the second peak are provided in a staggered mode, a driving block is provided in the driving groove, the guide seat is provided with a guide groove, the guide groove is distributed in a height direction of the guide seat, the driving block penetrates through the guide groove and extends into the sliding seat, and the driving block is arranged to drive the sliding seat to slide in the height direction of the guide seat;

the sliding seat is provided with at least two driving portions extending upwards, and the driving portions are arranged to reciprocate along with the sliding seat; and an upper end of the driving portion is a massage head or is connected to the massage head.

In practical design, the sliding seat is matched with the rotating seat, which allows the rotational stroke of the rotating motor to be converted into a vertical reciprocating stroke. This, in turn, enables the reciprocating movement of the sliding seat. Meanwhile, by providing at least two driving portions, a dual-drive structure can be achieved. For instance, when the driving portion extends or retracts, it can be used for percussive massage (although it can also be connected to other structures to achieve more linear reciprocating movement, or directly connected to the driving portion). For example, when connected to a massage head that swings in the middle, the upper end of the massage head can swing through the pivot point at the upper end of the driving portion, achieving a double kneading or tapping effect.

By using a single mechanism matched with two driving portions, the production cost of an additional motor can be saved, effectively reducing the overall production cost. At the same time, the use of a driving block and a driving groove allows for more linear driving, enhancing the user experience.

Furthermore, the sliding seat is matched with the rotating seat, and this matching enables faster movement frequency and more linear motion compared to a cam driving structure.

In specific embodiments, the structure with a single rotating motor allows for a smaller overall product size while providing two stimulation modes: extension (pulling) and pulling, which stimulate the vagina and clitoris respectively, thereby enhancing the user experience.

In the accompanying drawings,

1, housing; 11, mounting cavity; 101, first peak; 102, second peak;

2, driving device; 20, rotating motor; 24*a*, driving structure; 21, rotating seat; 21*a*, driving groove; 22, guide seat; 221, first opening; 222, first cavity; 22*a*, guide groove; 23, sliding seat; 231, second opening; 232, second cavity; 23*a*, limiting groove; 24, driving block;

3, driving portion; 30, massage head; 31, first driving portion; 32, second driving portion; 32*a*, first side shell; 32*b*, second side shell; 33, inner cavity; 34, third guide shaft;

4, swing arm; 4*a*, hollow cavity; 41*a*, first guide shaft; 41*b*, second guide shaft; 42*a*, first guide hole; 42*b*, second guide hole;

51, first pivot hole; 52, second pivot hole; 52*a*, support arm; and

6*a*, vibration motor.

DETAILED DESCRIPTION OF THE EMBODIMENTS

The technical solutions in the embodiments of the present disclosure will be clearly and completely described below with reference to the accompanying drawings. Obviously, the described embodiments are only a part of the embodiments of the present disclosure, rather than all of the embodiments. Based on the embodiments of the present disclosure, all other embodiments obtained by those of ordinary skill in the art without creative efforts fall within the scope of protection of the present disclosure.

It should be noted that if there are directional indications (such as up, down, left, right, front, back, top, bottom, inside, outside, vertical, transverse, longitudinal, counter-clockwise, clockwise, circumferential, radial, axial . . . ), this directional indication is only used to explain the relative positional relationship, movement, etc. between the components in a specific posture (as shown in the accompanying drawings). If the specific posture changes, the directional indication also changes accordingly.

In addition, if there are descriptions involving "first" or "second" etc. in the embodiments of the present disclosure, the descriptions of "first" or "second" etc. are only for descriptive purposes and cannot be understood as instructions or implying its relative importance or implicitly specifying the quantity of the technical feature indicated. Therefore, features defined as "first" and "second" may explicitly or implicitly include at least one of these features. In addition, the technical solutions in various embodiments may be combined with each other, provided that such combinations are realizable by those skilled in the art. Where the combination of technical solutions is contradictory or unfeasible, it shall be deemed that such a combination does not exist and is not within the scope of protection required by the present disclosure.

Figure 1:
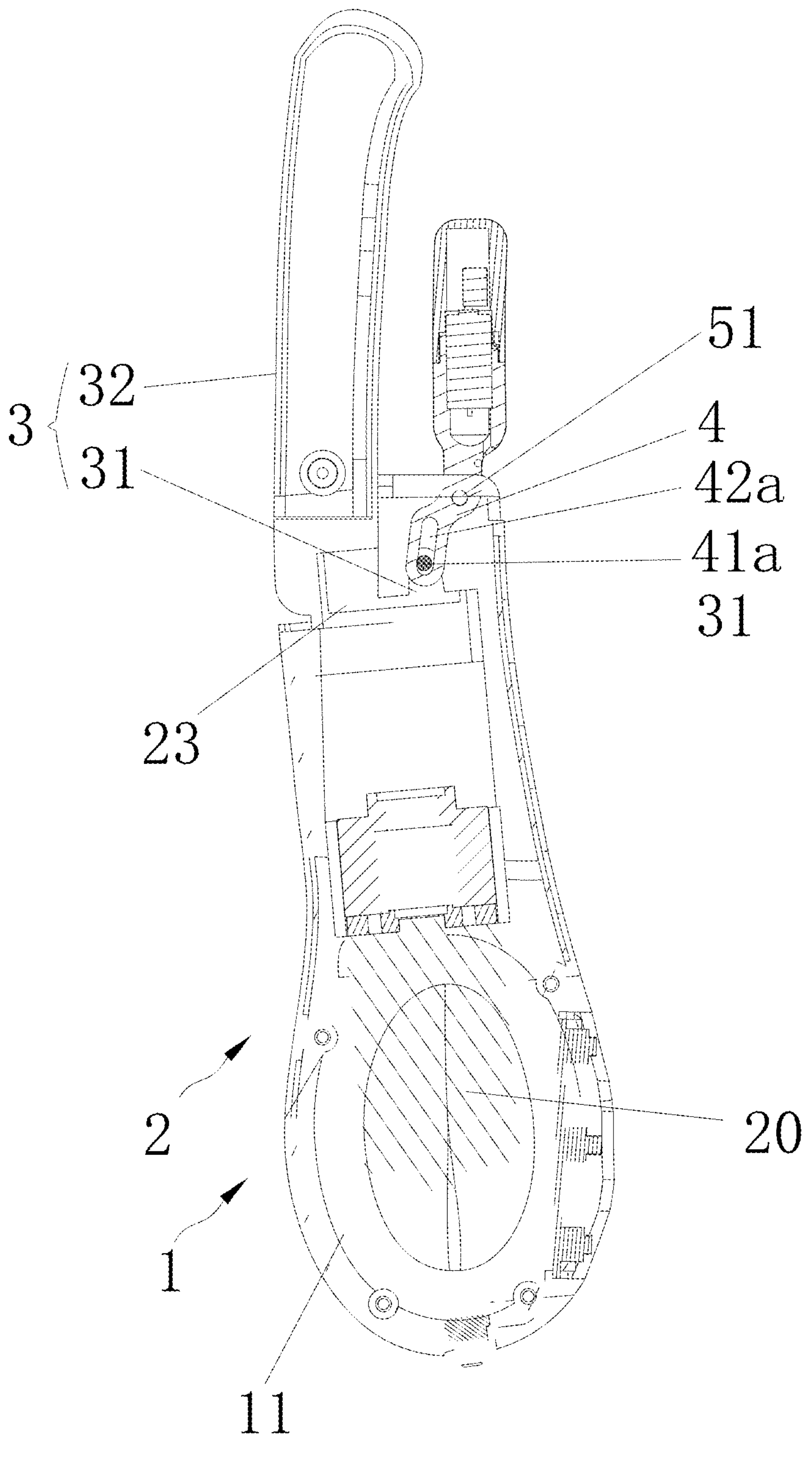
FIG. 1 is a sectional view of the extension and swing mechanism.
Figure 2:
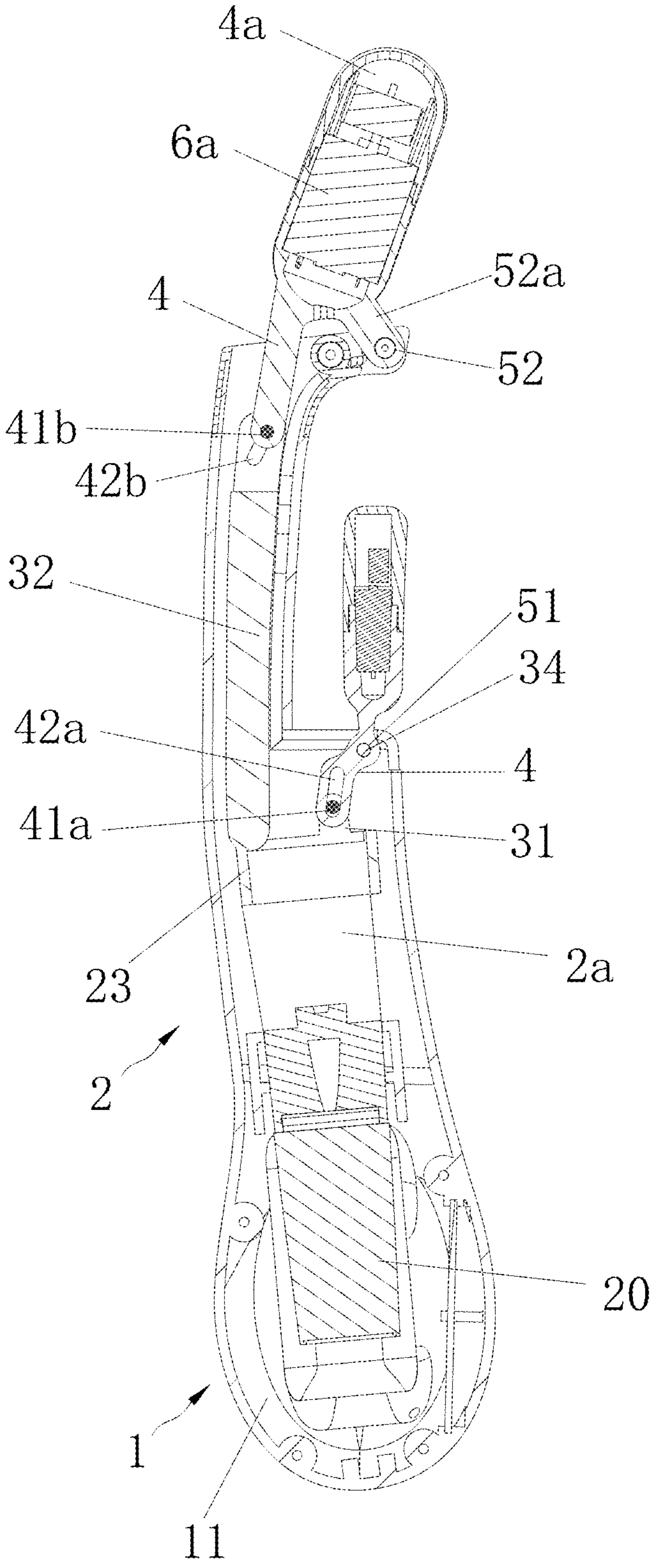
FIG. 2 is a sectional view of the dual-swing structure.
Figure 3:
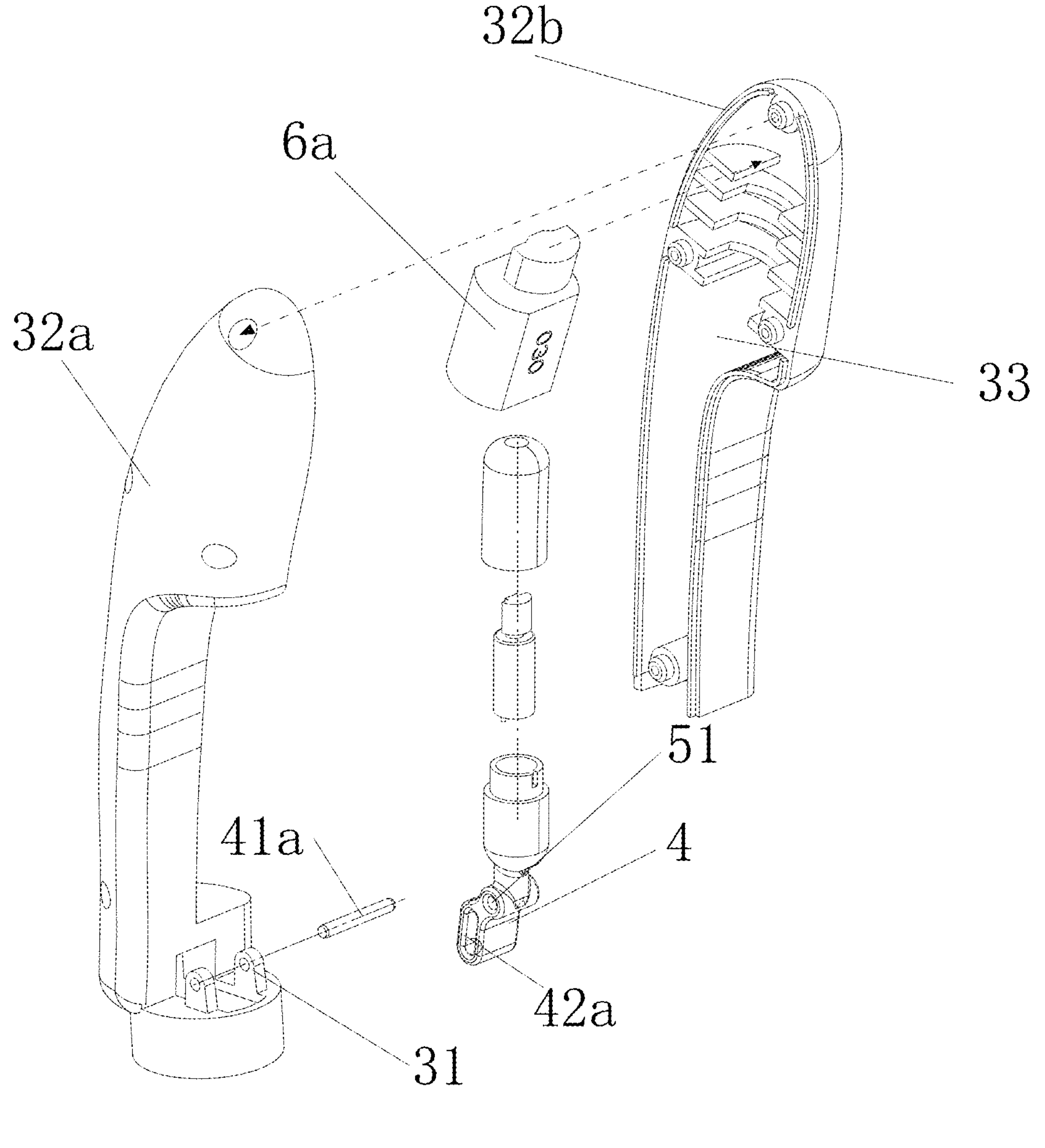
FIG. 3 is a partial exploded view.
Figure 4:
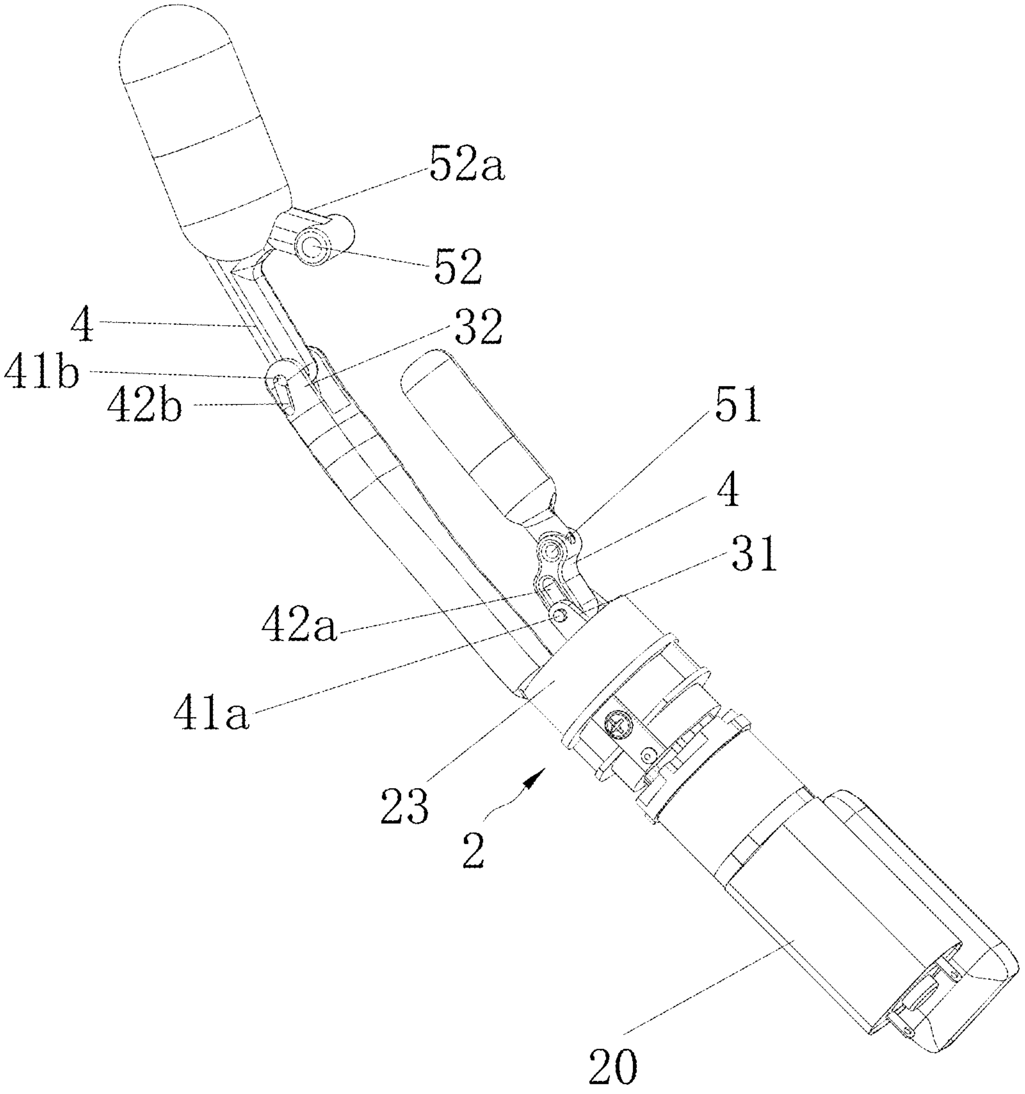
FIG. 4 is a schematic diagram showing the sliding seat matched with the driving portion.
Figure 5:
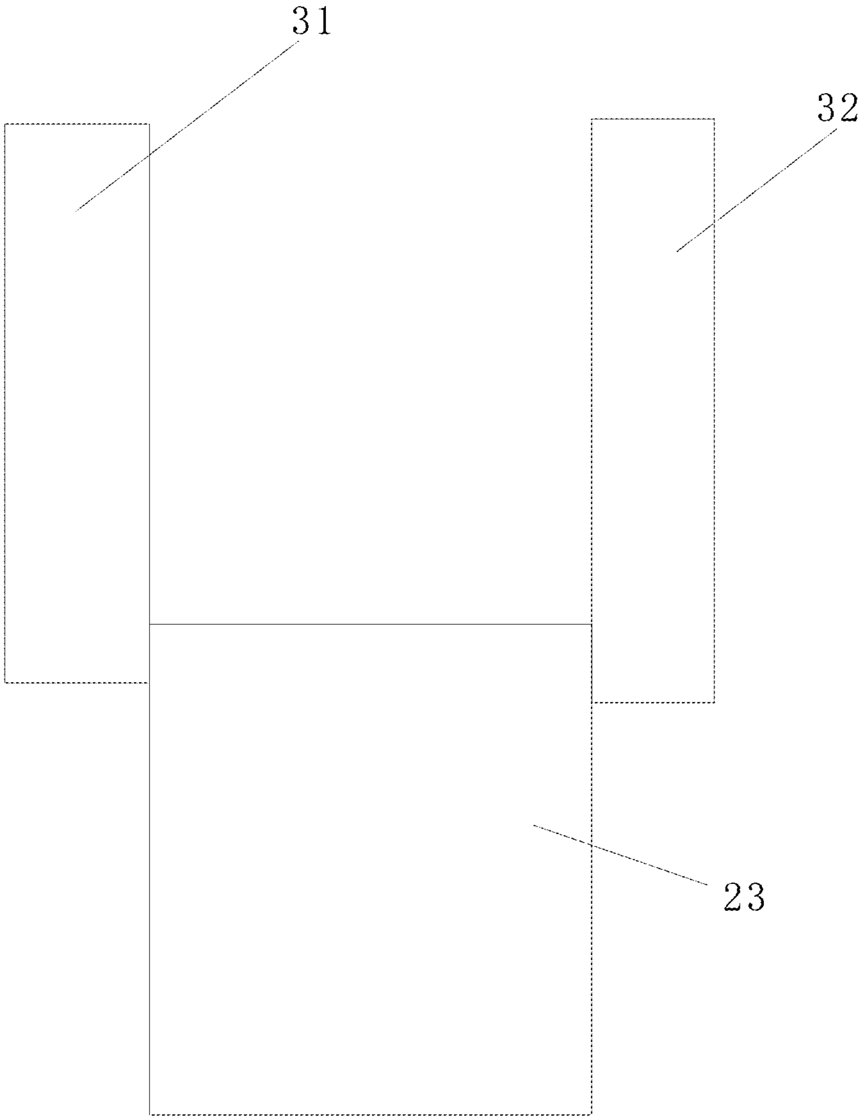
FIG. 5 is a schematic diagram when the driving portion is located on the side wall.
Figure 6:
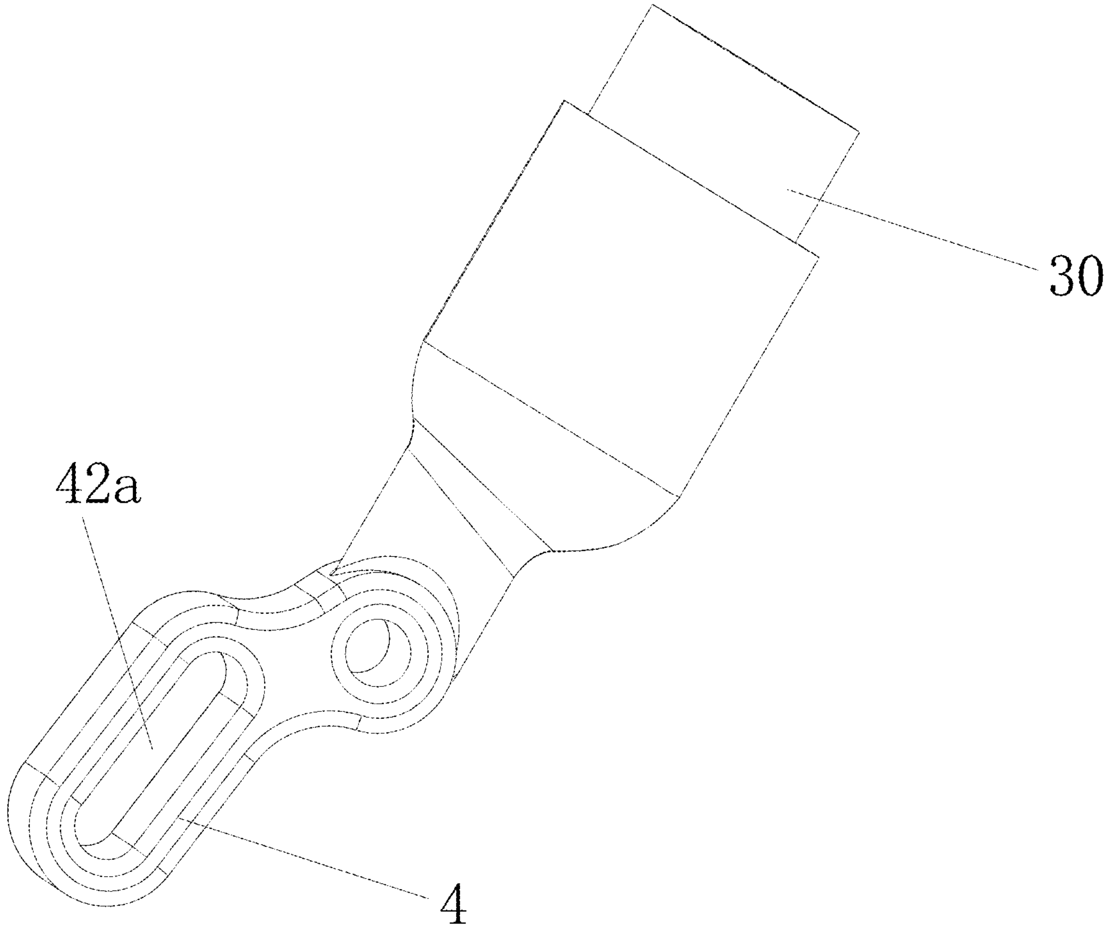
FIG. 6 is a three-dimensional schematic diagram of the first swing arm.
Figure 7:
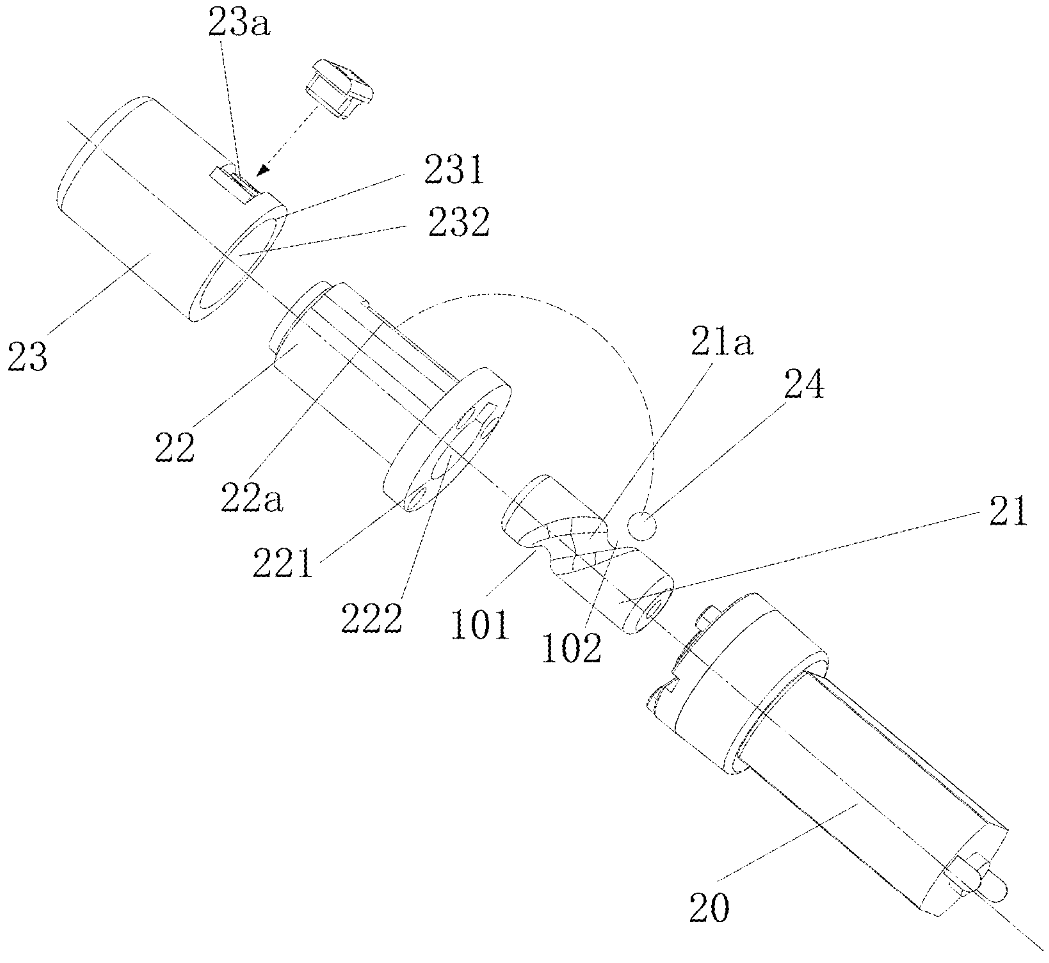
FIG. 7 is an exploded view of the driving structure.
Figure 8:
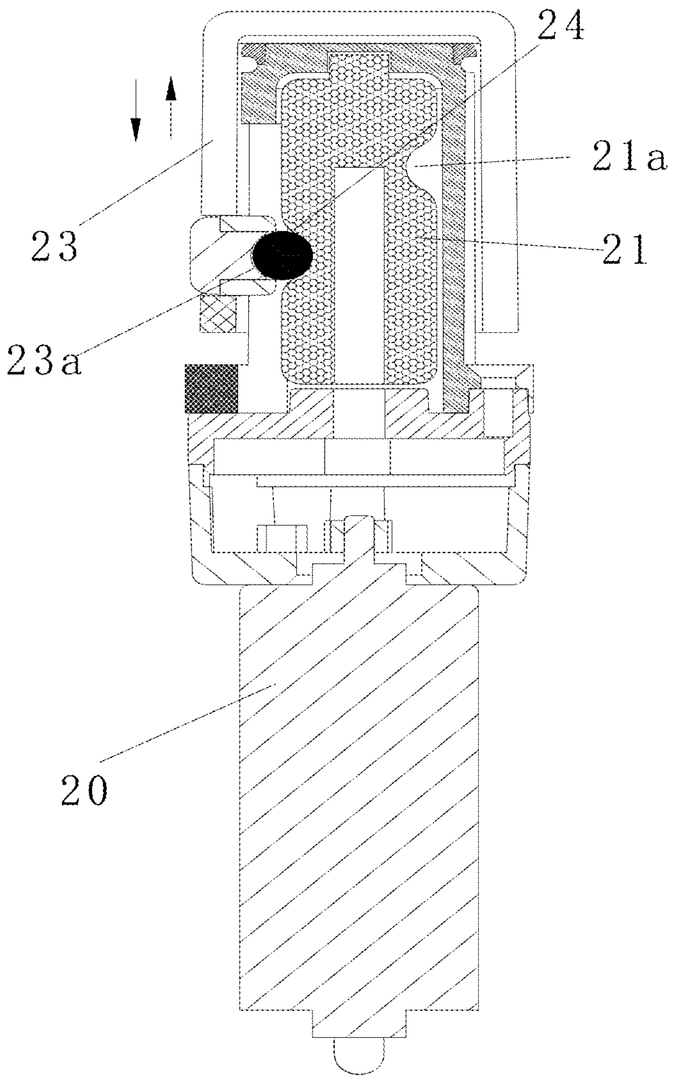
FIG. 8 is a sectional view of the driving structure.

As shown in FIG. 1 to FIG. 8, a sexual product with a dual-drive structure, comprising:

a housing 1, wherein the housing 1 is provided with a mounting cavity 11;

a driving device 2, wherein the driving device 2 is provided in the mounting cavity 11, the driving device 2 comprises a rotating motor 20 and a driving structure 24*a*, and the driving structure 21*a* is connected to the rotating motor 20;

the driving structure 24*a* comprises a rotating seat 21, a guide seat 22 and a sliding seat 23, the rotating seat 21 is connected to the rotating motor 20, the guide seat 22 is provided on an outer wall of the rotating seat 21, and the sliding seat 23 is provided on an outer wall of the guide seat 22;

the outer wall of the rotating seat 21 is provided with a driving groove 21*a*, the driving groove 21*a* forms a closed loop around the outer wall of the rotating seat 21, the driving groove 21*a* is provided with a first peak 101 and a second peak 102, the first peak 101 and the second peak 102 are provided in a staggered manner, a driving block 24 is provided in the driving groove 21*a*, the guide seat 22 is provided with a guide groove 22*a*, the guide groove 22*a* is distributed in a height direction of the guide seat 22, the driving block 24 penetrates through the guide groove 22*a* and extends into the sliding seat 23, and the driving block 24 is arranged to drive the sliding seat 23 to slide in the height direction of the guide seat 22;

the sliding seat 23 is provided with at least two driving portions 3 extending upwards, and the driving portions 3 are arranged to reciprocate along with the sliding seat 23; and an upper end of the driving portion 3 is a massage head 30 or is connected to the massage head 30.

In practical design, the sliding seat 23 is matched with the rotating seat 21, which allows the rotational movement of the rotating motor 20 to be converted into a vertical reciprocating movement. This, in turn, enables the reciprocating movement of the sliding seat 23. Meanwhile, by providing at least two driving portions 3, a dual-drive structure can be achieved. For instance, when the driving portion 3 extends or retracts, it can be used for percussive massage (although it can also be connected to other structures to achieve more linear reciprocating movement, or directly connected to the driving portion 3). For example, when connected to a massage head 30 that swings in the middle, the upper end of the massage head 30 can swing through the pivot point at the upper end of the driving portion 3, achieving a double kneading or tapping effect.

By using a single mechanism matched with two driving portions 3, the production cost of an additional motor can be saved, effectively reducing the overall production cost. At the same time, the use of a driving block 24 and a driving groove 21*a* allows for more linear driving, enhancing the user experience.

Furthermore, the sliding seat 23 is matched with the rotating seat 21, and this matching enables faster movement frequency and more linear motion compared to a cam driving structure.

Specifically, the mounting cavity 11 is provided with a third guide shaft 34, the third guide shaft 34 is used for mounting a swing arm 4, the swing arm 4 takes the third guide shaft 34 as a fulcrum, a lower end of the swing arm 4 is connected to the driving portion 3, and the massage head 30 is provided at an upper end of the swing arm 4; and when the driving portion 3 reciprocates in a vertical direction, the massage head 30 at the upper end of the swing arm 4 is arranged to be driven to swing in a reciprocating mode.

Specifically, a rear end of the swing arm 4 is provided with a long-strip-shaped first guide hole 42*a*, the driving portion 3 is provided with a first guide shaft 41*a* matched with the first guide hole 42*a*, and the first guide shaft 41*a* is arranged to slide in a length direction of the first guide hole 42*a*, thereby driving the massage head 30 to swing.

In another embodiment, the upper end of the driving portion 3 is provided with a long-strip-shaped second guide hole 42*b*, the swing arm 4 is provided with a second guide shaft 41*b* matched with the second guide hole 42*b*, and the second guide shaft 41*b* is arranged to slide in a length direction of the second guide shaft 41*b*, thereby driving the massage head 30 to swing.

The structure of the guide hole and guide shaft can also be achieved through the use of a connecting rod, and two ends of the connecting rod are pivotally connected to the driving portion 3 and the rear end of the swing arm 4, respectively.

In another embodiment, the massage head 30 and the swing arm 4 are integrated.

Specifically, the massage head 30 and the swing arm 4 are integrated, and the massage head 30 extends in an arc shape from the upper end of the swing arm 4. The stagger between the massage head 30 and the driving portion 3 is achieved through the curvature of the massage head 30.

Specifically, a middle of the swing arm 4 is provided with a first pivot hole 51, the third guide shaft 34 is provided in the first pivot hole 51, and the first pivot hole 51 and the third guide shaft 34 are arranged in a staggered manner, thus facilitating the reciprocating motion of the massage head.

Specifically, the swing arm 4 is arranged in a bent shape, and the first pivot hole 51 and the massage head 30 are arranged in a staggered manner.

Specifically, a support arm 52*a* extends from the middle of the swing arm 4, the support arm 52*a* is provided with a second pivot hole 52. The arrangement of the support arm 52*a* ensures that the driving structures of the two driving portions do not interfere with each other, making it suitable for both situations where the two massage heads are located on the same horizontal plane and where the two massage heads are located on different horizontal planes.

Specifically, the upper ends of the first driving portion 31 and the second driving portion 32 are arranged in a staggered manner, or in a flush manner.

Specifically, the driving portion 3 comprises a first driving portion 31 and a second driving portion 32, the upper end of the first driving portion 31 is lower than the upper end of the second driving portion 32, the second driving portion 32 extends upwards from the sliding seat 23, and the second driving portion 32 is rod-shaped.

Specifically, the second driving portion 32 is of a solid structure or a hollow structure, for example, when the second driving portion 32 is of a hollow structure, the second driving portion 32 may be of a telescopic structure, and when the second driving portion 32 is of a solid structure, the second driving portion 32 may be connected to the swing arm 4.

Specifically, the massage head 30 is provided at the upper end of the second driving portion 32, and the massage head 30 is arranged to reciprocate along with the second driving portion 32.

In another embodiment, the upper ends of the first driving portion 31 and the second driving portion 32 are located at the same horizontal position, thereby achieving a dual-drive structure, such as dual extension or dual swing.

Specifically, the guide seat 22 is a first cavity 222 with a first opening 221 at a lower end, and the first cavity 222 is provided with the guide groove 22*a* penetrating through a side wall of the guide seat 22;

- the rotating seat 21 is provided in the first cavity 222; the rotating seat 21 is fixedly provided on an upper wall of the rotating motor 20; and
- the sliding seat 23 is a second cavity 232 with a second opening 231 at a lower end, the guide seat 22 is provided in the second cavity 232, an inner wall of the sliding seat 23 is provided with a limiting groove 23*a*, one portion of the driving block 24 is clamped into the driving groove 21*a*, and another portion of the driving block 24 penetrates through the guide groove 22*a* and then is clamped into the limiting groove 23*a*, thereby achieving vertical reciprocating movement of the driving seat, which further makes the movement of the massage head more linear.

The driving block is a ball, a locating pin or a pin shaft, thereby achieving the displacement of the sliding seat.

Specifically, the swing arm 4 and the massage head 30 are integrated.

The upper end of the swing arm 4 is provided with a hollow cavity 4*a*, and a vibration motor 6*a* is provided in the hollow cavity 4*a*.

Specifically, the vibration motor 6*a* can provide a more diverse stimulating sensation at sensitive points.

Specifically, when the second driving portion 32 is a hollow cavity, the second driving portion 32 is used to simulate the structure of a penis, and the second driving portion 32 can reciprocate with the sliding seat 23.

Specifically, the second driving portion 32 comprises a first side shell 32*a* and a second side shell 32*b*, the first side shell 32*a* extends upwards from the sliding seat 23, the second side shell 32*b* is detachably installed on the first side shell 32*a*, the first side shell 32*a* and the second side shell 32*b* enclose an inner cavity 33, and the inner cavity 33 is provided with the vibration motor 6*a*, thereby providing a more diverse stimulating sensation.

Specifically, the massage portion includes a first massage portion and a second massage portion. The first massage portion can swing reciprocally, and the second massage portion can swing reciprocally or extend and retract reciprocally.

Specifically, the massage head is also covered with an elastic skin layer, preferably an integrally covered layer (with a profiled structure).

The above descriptions are only preferred embodiments of the present disclosure and are not intended to limit the patent scope of the present disclosure, and any equivalent structural transformation made by the description and drawings of the present disclosure or direct/indirect application in other related technical fields is included in the patent protection scope of the present disclosure under the inventive concept of the present disclosure.

What is claimed is:

1. A sexual product with a dual-drive structure, comprising:

- a housing, wherein the housing is provided with a mounting cavity;
- a driving device, wherein the driving device is provided in the mounting cavity, the driving device comprises a rotating motor and a driving structure, and the driving structure is connected to the rotating motor;
- the driving structure comprises a rotating seat, a guide seat and a sliding seat, the rotating seat is connected to the rotating motor, the guide seat is provided on an outer wall of the rotating seat, and the sliding seat is provided on an outer wall of the guide seat;
- the outer wall of the rotating seat is provided with a driving groove, the driving groove forms a closed loop around the outer wall of the rotating seat, the driving groove is provided with a first peak and a second peak, the first peak and the second peak are provided in a staggered manner, a driving block is provided in the driving groove, the guide seat is provided with a guide groove, the guide groove is distributed in a height direction of the guide seat, the driving block is configured to penetrate through the guide groove and extend into the sliding seat, and the driving block is arranged to drive the sliding seat to slide in the height direction of the guide seat;
- the sliding seat is provided with at least two driving portions extending upwards, and the at least two driving portions are arranged to reciprocate along with the sliding seat; and
- a massage head, wherein an upper end of a first driving portion of the at least two driving portions is the massage head or is connected to the massage head;
- wherein the mounting cavity is provided with a third guide shaft, the third guide shaft is used for mounting a swing arm, the swing arm takes the third guide shaft as a fulcrum, a lower end of the swing arm is connected to the first driving portion of the at least two driving portions, and the massage head is provided at an upper end of the swing arm; and when the first driving portion of the at least two driving portions reciprocates in a vertical direction, the massage head at the upper end of the swing arm is arranged to be driven to swing in a reciprocating mode.

2. The sexual product with the dual-drive structure according to claim 1, wherein a rear end of the swing arm is provided with a long-strip-shaped first guide hole, the first driving portion of the at least two driving portions is provided with a first guide shaft matched with the first guide hole, and the first guide shaft is arranged to slide in a length direction of the first guide hole.

3. The sexual product with the dual-drive structure according to claim 1, wherein the upper end of the first driving portion of the at least two driving portions is provided with a long-strip-shaped second guide hole, the swing arm is provided with a second guide shaft matched with the second guide hole, and the second guide shaft is arranged to slide in a length direction of the second guide shaft.

4. The sexual product with the dual-drive structure according to claim 1, wherein the massage head and the swing arm are integrated, and the massage head extends in an arc shape from the upper end of the swing arm.

5. The sexual product with the dual-drive structure according to claim 1, wherein a middle of the swing arm is provided with a first pivot hole, the third guide shaft is provided in the first pivot hole.

6. The sexual product with the dual-drive structure according to claim 5, wherein the swing arm is arranged in a bent shape, and the first pivot hole and the massage head are arranged in a staggered manner.

7. The sexual product with the dual-drive structure according to claim 1, wherein a support arm extends from a middle of a second swing arm, the support arm is provided with a second pivot hole.

8. The sexual product with the dual-drive structure according to claim 1, wherein the at least two driving portions comprise the first driving portion and a second driving portion, and upper ends of the first driving portion and the second driving portion are arranged in a staggered or flush manner.

9. The sexual product with the dual-drive structure according to claim 8, wherein the second driving portion extends upward from the sliding seat, and the second driving portion is rod-shaped.

10. The sexual product with the dual-drive structure according to claim 9, wherein the second driving portion is of a solid structure or a hollow structure.

11. The sexual product with the dual-drive structure according to claim 9, wherein the upper end of the first driving portion is lower than the upper end of the second driving portion.

12. The sexual product with the dual-drive structure according to claim 8, wherein a second massage head is provided at the upper end of the second driving portion, and the second massage head is arranged to reciprocate along with the second driving portion.

13. The sexual product with the dual-drive structure according to claim 12, wherein the second driving portion is a hollow cavity, the second driving portion is of a structure configured for simulating a penis, and the second driving portion is arranged to reciprocate along with the sliding seat.

14. The sexual product with the dual-drive structure according to claim 8, wherein the upper ends of the first driving portion and the second driving portion are arranged in a flush manner.

15. The sexual product with the dual-drive structure according to claim 8, wherein the second driving portion comprises a first side shell and a second side shell, the first side shell extends upwards from the sliding seat, the second side shell is detachably installed on the first side shell, the first side shell and the second side shell enclose an inner cavity, and the inner cavity is provided with a vibration motor.

16. The sexual product with the dual-drive structure according to claim 1, wherein the guide seat is a first cavity with a first opening at a lower end, and the first cavity is provided with the guide groove penetrating through a side wall of the guide seat;

the rotating seat is provided in the first cavity; the rotating seat is fixedly provided on an upper wall of the rotating motor; and the sliding seat is a second cavity with a second opening at a lower end, the guide seat is provided in the second cavity, an inner wall of the sliding seat is provided with a limiting groove, one portion of the driving block is clamped into the driving groove, and another portion of the driving block penetrates through the guide groove and then is clamped into the limiting groove.

17. The sexual product with the dual-drive structure according to claim 1, wherein the swing arm and the massage head are integrated.

18. The sexual product with the dual-drive structure according to claim 1, wherein the upper end of the swing arm is provided with a hollow cavity, and a vibration motor is provided in the hollow cavity.

* * * * *